Sept. 9, 1969          G. FONDA-BONARDI          3,466,061
                          ROTARY JOINT
Filed July 17, 1967                              3 Sheets-Sheet 1
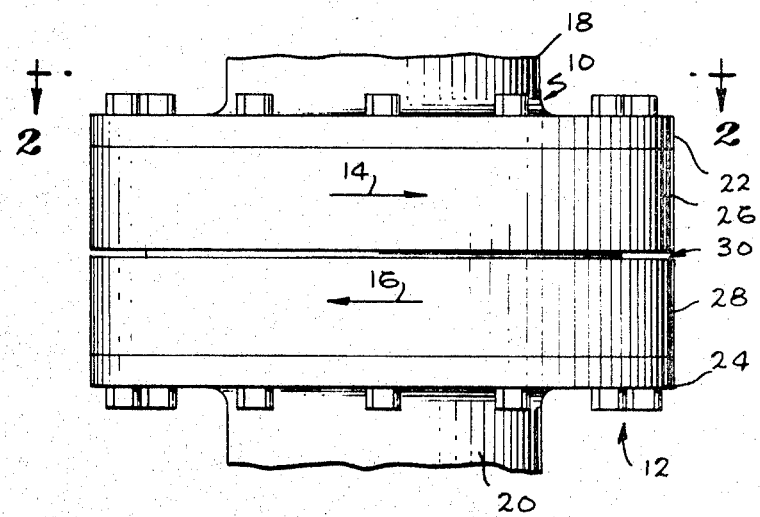
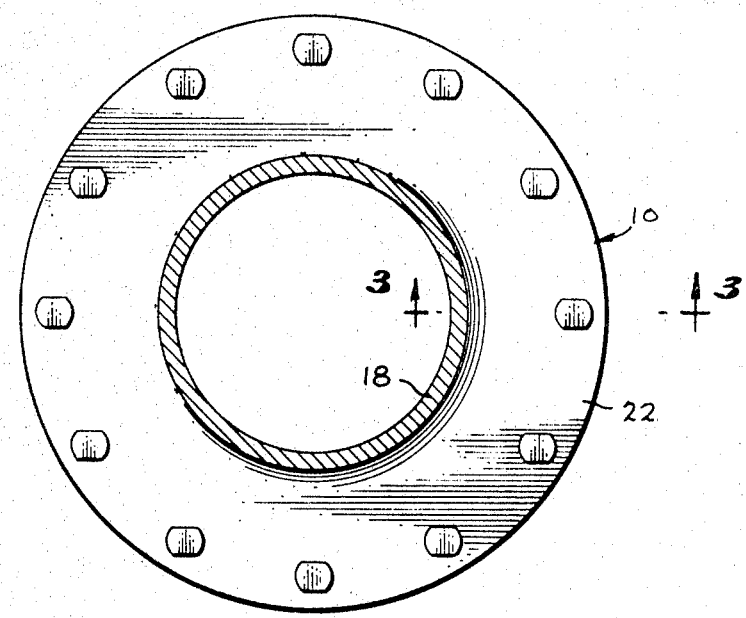
INVENTOR.
GIUSTO FONDA-BONARDI
BY
Ernest L. Brown
ATTORNEY

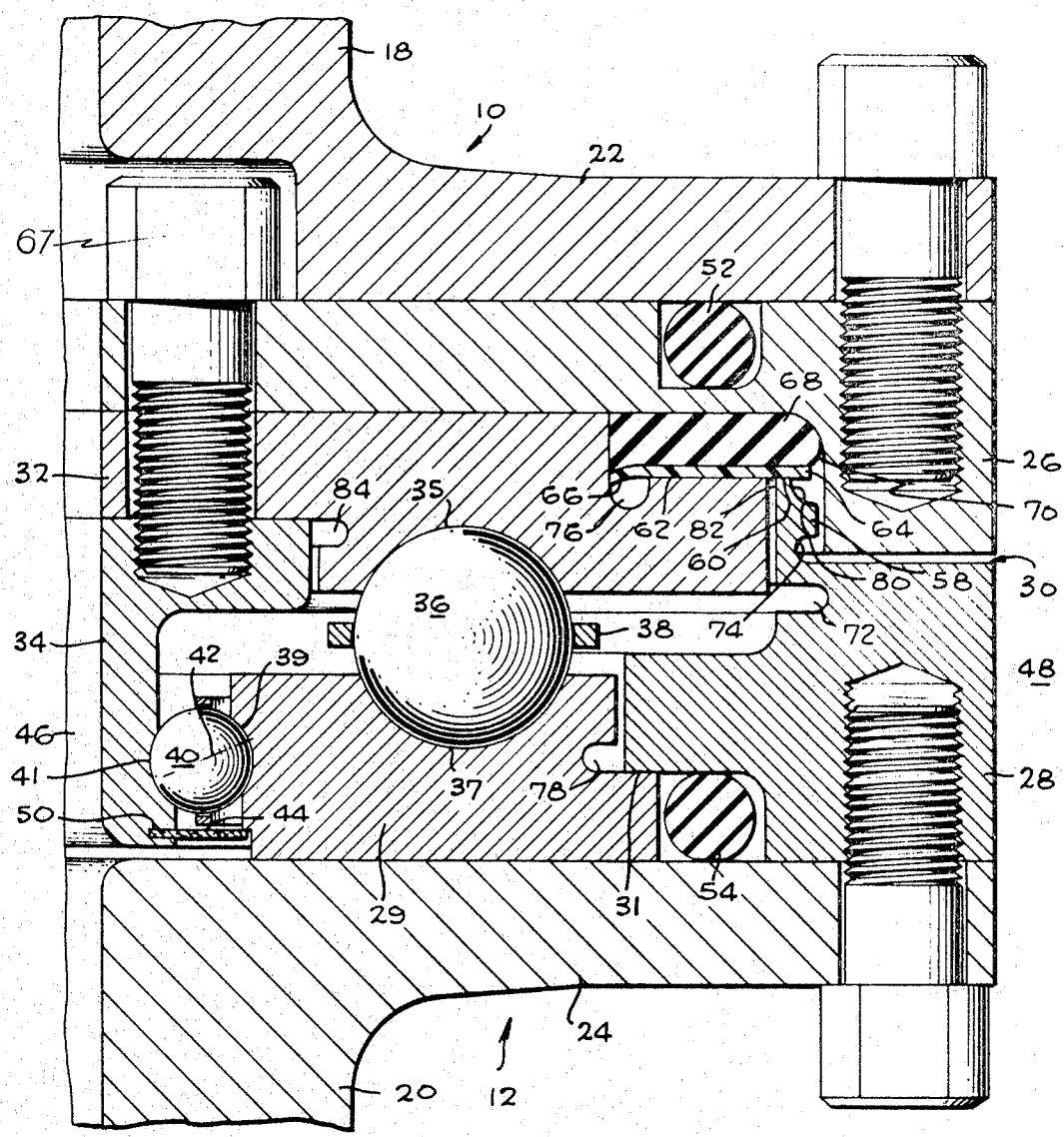

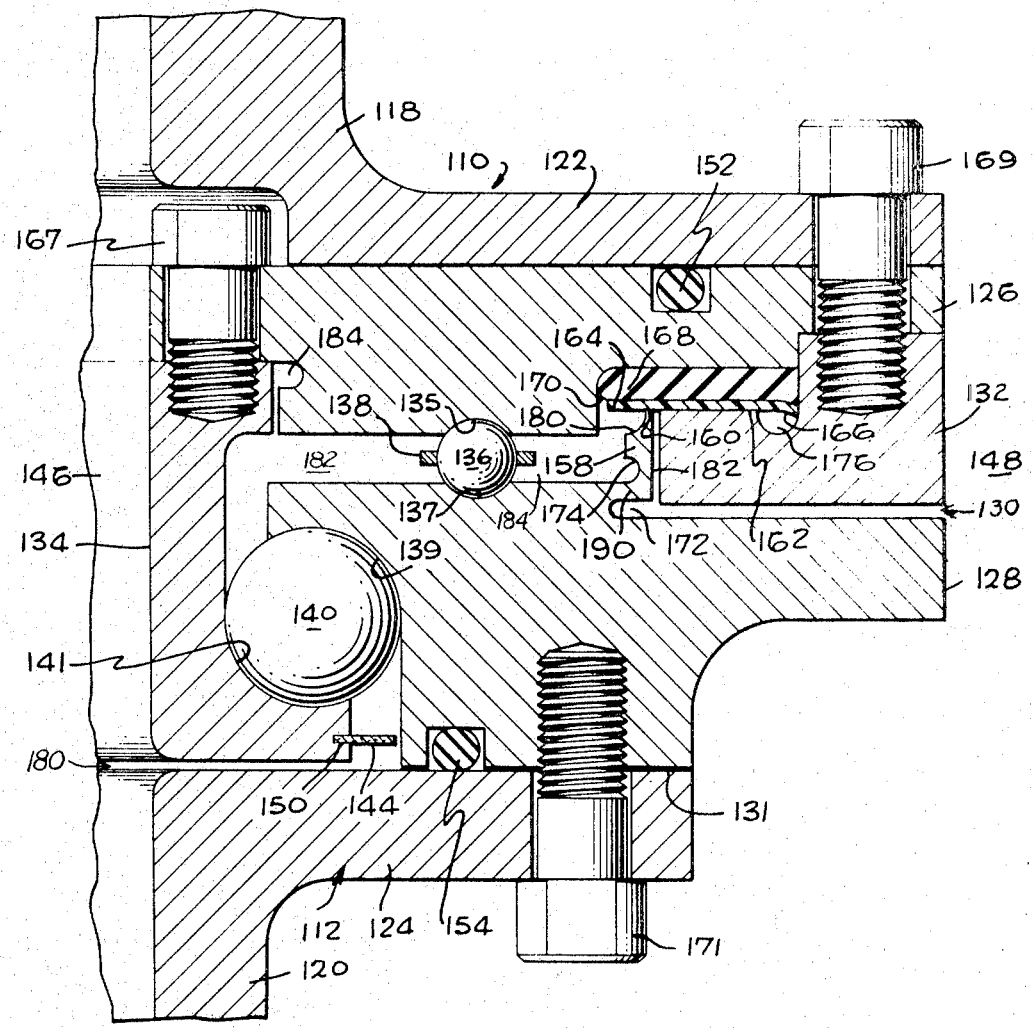

United States Patent Office 3,466,061
Patented Sept. 9, 1969

3,466,061
ROTARY JOINT
Giusto Fonda-Bonardi, Los Angeles, Calif., assignor to Litton Systems, Inc., Beverly Hills, Calif., a corporation of Maryland
Continuation-in-part of application Ser. No. 486,286, Sept. 10, 1965. This application July 17, 1967, Ser. No. 654,041
Int. Cl. F16l 19/02, 17/06
U.S. Cl. 285—95                17 Claims

ABSTRACT OF THE DISCLOSURE

A rotary joint, and a seal for a rotary joint which is useful in diving suits, space suits, and the like.

A pair of hollow shafts are held assembled by retaining bearings, and thrust bearing means are provided for carrying axial loads. Resilient seal means are positioned on one of the hollow shafts for contacting a hard sealing surface on the other shaft. Means are provided to control the sealing pressures on the sealing surfaces so that the sealing force is substantially constant or increases only slightly with large changes in differential pressure across the seal.

Short description of the invention

This is a continuation-in-part of application Ser. No. 486,286, filed Sept. 10, 1965, by Giusto Fonda-Bonardi for a "Rotary Joint" and now abandoned.

Certain joints of the body such as the wrist, shoulder, hip, or knee have a rotation or shaft-like motion. Such rotation is frequently called supination-pronation. Webster's new Collegiate dictionary, copyrighted 1951 by G. & C. Merriam Company defines supination and pronation as follows:

"Supination—Rotation of the forearm and hand or, loosely, of other joints, as the shoulder, hip, or knee, backward and away from the mid-line of the body."

"Pronation—Rotation of the forearm and hand or, loosely, of other joints, as the shoulder, hip, or knee, forward and toward the mid-line of the body."

In addition, flexion or bending of the hip and shoulder may be characterized as rotations about reference axes meeting at an inaccessible point inside the body.

The rotations of the body described above, preferably, are mechanized in a diving or space suit with a hollow-shaft-like structure which is called a rotary joint. Such a rotary joint is characterized by two hollow shafts having a common axis of relative rotation. The space between the relatively moving shafts must be sealed against pressure differential to protect the occupant inside the suit.

In the rotary joint of this invention, used where the external pressure is higher than the internal pressure, the axial load between the shafts is carried by a thrust bearing, preferably of the ball bearing or rotor bearing type.

In the rotary joint of this invention, wherein the pressure external of the joint is lower than the pressure internal of the joint, the axial load between the shafts is carried by a tension bearing, preferably of the loaded ball bearing or roller bearing type.

The seal between the two parts is dynamically balanced so that the sealing force is substantially constant or increases only slightly with large changes in differential pressure across the seal.

The sealing action of the separable seal depends on the plastic flow of a relatively soft sealing element which, under pressure, fills and blocks the microscopic crevices and grooves of a harder element. The required sealing force is small if the mating surfaces are smooth. However, a limit is found in the machining and polishing operations on the harder surface which also leave tool marks, no matter how small, and in the microscopic inhomogeneities of the materials. The seal will leak if the closing force is insufficient to cause plastic deformation of the soft sealing element, because the sealing element then touches the mating surface only in discrete areas, and a continuous open path exists around these discrete areas from one side to the other of the seal. When pressure is applied across the seal, the fluid pressure forces its way into the spaces between the contacting areas and tends to force the sealing surfaces apart. The presence of high pressure fluid between the sealing surfaces requires an increased force to be applied in the direction of closing the seal in order to maintain adequate deformation of the soft sealing element to maintain the seal.

In the seal which is used in this invention, to maintain the sealing action, the hydrostatic pressure on the high pressure side of the joint is used to balance the hydrostatic pressure tending to force its way between the sealing surfaces.

The first described embodiment of this invention shows the seal which is used with an external over pressure such as that found under driving conditions.

The second described embodiment of this invention is used with an internal over pressure, such as that found in outer space, wherein the seal is shown reversed from that with an external over pressure.

It is therefore an object of this invention to seal a rotary joint.

It is another object of this invention to improve rotary joints.

It is yet another object of this invention to provide an improved rotary joint which is useful in a protective suit having pressure differentials between the inside and outside thereof.

It is still another object of this invention to provide an improved rotary joint and seal for a diving suit.

It is another object of this invention to provide an improved rotary joint and seal for a space suit.

Other objects will become apparent from the following description, taken in connection with the accompanying drawings, in which:

FIGURE 1 is an external view of a typical rotary joint, in accordance with this invention;

FIGURE 2 is a view, partly in section, taken at 2—2 in FIGURE 1;

FIGURE 3 is a view, mostly in section, taken at 3—3 in FIGURE 2 showing a first embodiment of the invention which is adapted for external over pressure; and FIGURE 4 is a view, mostly in section, taken at 3—3 in FIGURE 2 showing an embodiment adapted for internal over pressure.

Referring to FIGURES 1 and 2, members 10 and 12 are adapted to be rotated relative to each other about a common axis, as shown by arrows 14 and 16. The member 10—for example—might be connected to the forearm portion of a diving or space suit while the member 12 might be connected to the hand portion of the suit to allow freedom of rotation between the forearm and the hand portions.

The details of the rotary joint and the seal of this invention, in a diving suit configuration, are shown more particularly in the sectional view of FIGURE 3. The member 18 has a flange portion 22 while the member 20 has a flange portion 24. A washer 26 is screwed to the flange portion 22. An O-ring 52 is positioned between flange 22 and washer 26 to seal the surfaces therebetween. It is to be noted that no relative motion occurs between members 22 and 26. The O-ring 52 may—for example—be fabricated of neoprene. A thrust bearing washer 32 having a bearing race 35, and a bearing support collar 34 having a bearing race 41 are screwed to washer 26.

A collar 28 is screwed to flange 24. Collar 28 carries the hard portion 58 of the rotary seal of this invention. A thrust bearing washer 29 having a bearing race 37 is thereon held in place by collar 28 at engaging surface 31. An O-ring 54 is positioned to prevent leakage between members 28 and 24. Thrust bearing washer 29 also carries a bearing race 39.

A plurality of balls forming a ball bearing, of which one is shown at 36, and which are preferably enclosed in a bearing cage such as 38, carry the thrust load between members 10 and 12. The thrust load is generated by the over pressure external to the joint at 48.

To hold the joint together when no external pressure is applied, a ball bearing comprising a plurality of balls, of which one is shown at 40, are engaged by the diagonally loaded bearing races 39 and 41. The angle of loading of the bearings is shown by the axis 42.

The soft sealing element 64 of the rotary seal (made—for example—of Teflon) is supported on one side at surface 62 of washer 32. A resilient backup member 68 (made—for example—of rubber) is compressed between the resilient member 64 and washer 26. It is evident that members 64 and 32 could be made of the same material, provided the material was sufficiently compressible to perform the function of backup washer 32 and had sufficient low friction at the surface 60. Further, the members 64 and 32 could be attached together for convenience.

The rotary seal is made on an annular surface 60 of the hard sealing member 58 which is preferably highly polished and made of hard metal. The thickness of the sealing surface 60 is between surfaces 80 and 82 and is preferably as narrow as possible to reduce the friction torque between the members 10 and 12 but not sufficiently narrow that it cuts the resilient soft sealing member 64.

The sealing load is placed on the sealing surface 60 by making the thickness of the rubber material 68 before it is compressed larger than the space between member 26 and soft sealing member 64. As the pieces are screwed together, sealing force is applied to compress the rubber 68. The compression of the rubber 68 causes it to bulge, as shown at 70.

A plurality of screws, radially positioned in the position of screw 67 hold members 26, 32 and 34 together. The head of screw 67 pushes downward against member 26. The threads of screw 67 pull member 34 up tight against member 32 which pre-loads ball bearing 40. Ball bearing 40 transmits pre-load force through member 29, across surface 31 to surface 60 which pre-loads the sealing surface 60 against the resiliency of members 64 and 68.

The surface 70 of rubber 68, as well as the sealing surface 60 is open, through channel 30, to the high pressure side 48. The high pressure fluid in channel 30 not only tends to force the sealing surface 60 apart, but also presses against surface 70 of rubber insert or washer 68, which transmits the pressure through the sealing member 64 to hold the members 58 and 64 in engagement.

As the axial load on the rotary joint increases, all of the members tend to deform elastically which causes some additional load to be applied from washer 26 through rubber washer 68 and soft sealing member 64 to increase the normal force on the sealing surface 60. The increase of the sealing force on surface 60 increases the friction between members 58 and 64. However, relief grooves 72 and 74 are cut in members 58—thereby forming a bellows—which allows member 58 to be flexed downward to relieve the additional force applied to the surface 60. The undercuts 72 and 74 are adjusted so that, with an increase in pressure in the region 48, the normal force on surface 60 increases only slightly with the increasing pressure. It is not desirable to design the seal so that the normal force on surface 60 decreases with increasing pressure in the region 48 because a decreasing normal force would eventually open the seal.

Undercuts 76, 78 and 84 are to relieve the square corners to prevent cracking of the members under pressure.

The region 46 is interior of the diving suit where dirt or grease may tend to be channeled into the bearing 40. To prevent or reduce the accumulation of dirt in the bearing 40, a felt washer 44, which is inserted into collar 34 at 50, is used to block the flow of air in that region.

The details of the rotary joint and the seal of this invention, in an embodiment which is adapted for use in outer space, are shown more particularly in the sectional view of FIGURE 4. The member 118 has a flange portion 122 while the member 120 has a flange portion 124. A washer 126 is screwed to the flange portion 122. An O-ring 152 is positioned between flange 122 and washer 126 to seal the surfaces therebetween. It is to be noted that no relative motion occurs between members 122 and 126. The O-ring 152 may—for example—be fabricated of neoprene. A bearing race 135 is formed on one surface of washer 126.

A washer 132 having a support shelf 162, and a bearing support collar 134 having a bearing race 141 are screwed to washer 126.

A collar 128 is screwed to flange 124. Collar 128 carries the hard portion 158 of the rotary seal of this invention. An O-ring 154 is positioned to prevent leakage between members 128 and 124. The member 128 carries a thrust bearing race 137 and a bearing race 139.

A plurality of balls forming a ball bearing, of which one is shown at 136, and which are preferably enclosed in a bearing cage such as 138, carry the small thrust load between members 110 and 112 when there is no pressure differential across the bearing.

The differential pressure load is carried by a ball bearing comprising a plurality of balls, one of which is shown at 140, and which are engaged by the diagonally loaded bearing races 139 and 141.

The soft sealing element 164 of the rotary seal (made—for example—of Teflon) is supported on one side at surface 162 of member 132. A resilient backup member 168 (made—for example—of rubber) is compressed between the resilient member 164 and washer 126. it is apparent, however, that elements 164 and 168 may be made of the same material provided that material has low friction characteristics and is sufficiently resilient and compressible.

The rotary seal is made on an annular surface 160 of the hard sealing member 158 which is preferably highly polished and made of hard metal. The thickness of the sealing surface 160 is between surfaces 180 and 182 and is preferably as narrow as possible to reduce the friction torque between the members 110 and 112 but not sufficiently narrow that it cuts the resilient soft sealing member 164.

The sealing load is placed on the sealing surface 160 by making the thickness of the rubber material 168, before it is compressed, larger than the space between members 126 and the soft sealing member 164. As the pieces are screwed together, sealing force is applied to press the rubber 168. The compression of the rubber 168 causes it to bulge as shown at 170.

A plurality of screws, radially positioned in the position of screw 167 holds members 126 and 134 together. The head of screw 167 pushes downward against member 126. The threads of screw 167 pull member 134 up tight against member 126 which pre-loads the ball bearing 140. Ball bearing 140 transmits pre-load force through member 128, to surface 160 which pre-loads the sealing surface 160 against the resiliency of members 164 and 168.

The surface 170 of rubber member 168, as well as the sealing surface 160 is open through channel 130, to the low pressure side 148. The high pressure on the inside 146 of the rotary joint is channeled through channels 180, 182 and 184 and through bearings 140 and 136. The high pressure fluid or gas in channel 184 not only tends to force the sealing surface 160 apart, but also presses against surface 170 of rubber insert or washer 168, which transmits the pressure through the sealing member 164 to hold the members 158 and 164 in engagement.

As the axial load on the rotary joint increases, all of the members tend to deform elastically which causes change in the load applied between washer 126 through rubber washer 168 and soft sealing member 164 to change the normal force on the sealing surface 160. The change of the sealing force on surface 160 changes the friction between members 158 and 164. Relief grooves 172 and 174 are cut in member 158—thereby forming a bellows—which allow member 158 to be flexed downward to adjust the normal forces applied to the surface 160. The undercuts 172 and 174 are adjusted so that, with an increase in pressure in the region 146 or a decrease in pressure in the region 148, the normal force on surface 160 changes only slightly with changing pressure differentials. It is not desirable to design the seal so that the normal force on surface 160 decreases with increasing pressure differential because such a decreasing normal force would eventually open the seal.

Undercuts 176 and 184 are to relieve the square corners to prevent cracking of the members under pressure.

The region 146 is interior of the suit where dirt or grease may tend to be channeled into the bearing 140. To prevent or reduce the accumulation of dirt in the bearing 140, a felt washer 144, which is inserted into collar 134 at 150, is used to block the flow of air or gas in that region.

Although the device of this invention has been described in detail above, it is not intended that the invention should be limited by that description.

I claim:

1. A rotary joint, joining two members having a common axis, adapted to allow turning, about said axis, one of said member relative to the other said member comprising:
    bearing means for carrying axial loads between said members;
    means for holding said members in assembled relation;
    means on a first said member forming a hard, smooth, flat, annular surface in a plane perpendicular to said axis to form a hard sealing surface;
    resilient means on the second said member and contacting said hard sealing surface to form an annular soft sealing surface;
    biasing means for pre-loading said soft sealing surface against said hard sealing surface, exposed to the high pressure side of said joint to control the sealing pressure between said sealing surfaces under variations of pressure differential across said joint; and
    a resilient bellows means between said hard sealing surface and said first member to selectably compensate for changes in sealing forces between said sealing surfaces.

2. A device as recited in claim 1 in which said two members having a common axis are substantially annular members.

3. A device as recited in claim 1 in which said biasing means further includes resilient back-up member bearing against said resilient means to transmit said pre-load to said sealing surfaces.

4. A device as recited in claim 1 in which said bearing means for carrying axial loads comprises a pair of circular bearing races having substantially the same centers coincident with said axis, and a plurality of ball bearings circumferentially arranged in said races.

5. A device as recited in claim 1 in which said means for holding said members in assembled relation are retaining bearings.

6. A device as recited in claim 1 in which said bearing means for carrying axial loads is a thrust bearing means and said bearing races are thrust bearing races.

7. A device as recited in claim 3 in which said resilient means is made of plastic, and said hard sealing surface is a metallic surface.

8. A device as recited in claim 7 in which said resilient back-up member is made of rubber.

9. A device as recited in claim 8 in which said bellows has a spring characteristic such that normal sealing pressure is maintained across said sealing surfaces.

10. A device as recited in claim 9 in which said bellows means have undercut portions.

11. A device as recited in claim 10 in which said plastic material is polytetrafluoroethylene.

12. A device as recited in claim 11 in which said pre-loading is obtained by compressing said rubber.

13. A device as recited in claim 1 in which said high pressure side is external of said joint.

14. A device as recited in claim 1 in which said high pressure side is internal of said joint.

15. In combination:
    two annular members having a common axis of rotation, adapted to allow turning, about said axis, of one said member relative to the other said member;
    bearing means for carrying axial loads between said members;
    means for holding said annular members in assembled relation;
    means on said first member forming a hard, smooth, flat, annular surface substantially in a plane perpendicular to said axis to form a hard sealing surface;
    annular resilient means forming a soft sealing surface on the second said member and contacting said hard sealing surface;
    biasing means for pre-loading said soft sealing surface against said hard sealing surface, said soft sealing surface being exposed to the high pressure side of said seal to control the sealing pressure between said sealing surfaces under variations of pressure differential; and
    a resilient bellows means between said hard sealing surface and said first member to compensate for changes in sealing forces between said sealing surfaces.

16. A device as recited in claim 15 in which said biasing means further includes a resilient backup member bearing against said above mentioned resilient means to transmit said pre-load to said sealing surfaces.

17. A rotary joint, joining two members having a common axis, adapted to allow turning, about said axis, of one said member relative to the other said member comprising:
    bearing means for carrying axial loads between said members;
    means on a first said member forming a metallic surface in a plane perpendicular to said axis to form a hard sealing surface;
    plastic means on the second said member and contacting said hard sealing surface to form an annular soft sealing surface;
    rubber means for pre-loading said soft sealing surface against said hard sealing surface, exposed to the high pressure side of said joint to control the sealing pressure between said sealing surfaces under variations of pressure differential across said joint; and a pair of relief undercut grooves in said first member spaced axially from said hard sealing surface to allow said first member to flex and to selectably compensate for changes in sealing forces between said sealing surfaces.

References Cited

UNITED STATES PATENTS

| | | | |
|---|---|---|---|
| 2,036,537 | 4/1936 | Otis | 285—281 X |
| 2,331,615 | 10/1943 | Meyer | 285—281 X |
| 2,815,973 | 12/1957 | Jackson | 285—276 X |
| 2,919,148 | 12/1959 | Smith | 308—187.1 |
| 3,058,761 | 10/1962 | Christophersen | 285—281 |
| 3,136,568 | 6/1964 | Ragsdale | 285—276 X |
| 3,177,012 | 4/1965 | Faccou | 285—281 X |
| 3,314,695 | 4/1967 | Perry | 285—276 X |

FOREIGN PATENTS 1,185,248   2/1959   France.

THOMAS F. CALLAGHAN, Primary Examiner

U.S. Cl. X.R.

2—2.1; 277—95; 285—276; 308—187.1.